(12) United States Patent
Cohen et al.

(10) Patent No.: US 7,139,692 B2
(45) Date of Patent: Nov. 21, 2006

(54) FLOW PROPAGATION ANALYSIS USING ITERATIVE SIGNALING

(75) Inventors: Alain Cohen, Washington, DC (US); Pradeep K. Singh, Arlington, VA (US); Arun Pasupathy, McLean, VA (US); Stefan Znam, Rockville, MD (US); Marius Popa, Chevy Chase, MD (US)

(73) Assignee: Opnet Technologies, Inc., Bethesda, MD (US)

( * ) Notice: Subject to any disclaimer, the term of this patent is extended or adjusted under 35 U.S.C. 154(b) by 722 days.

(21) Appl. No.: 10/325,148

(22) Filed: Dec. 20, 2002

(65) Prior Publication Data

US 2003/0117955 A1 Jun. 26, 2003

Related U.S. Application Data

(60) Provisional application No. 60/344,940, filed on Dec. 21, 2001.

(51) Int. Cl.
G06F 9/44 (2006.01)

(52) U.S. Cl. .......................... 703/21; 703/13; 709/235; 370/395.21

(58) Field of Classification Search ................. 703/21, 703/13; 709/235, 234, 225, 223, 224, 246; 370/395.21, 229, 254, 216, 252, 244; 705/1; 714/4
See application file for complete search history.

(56) References Cited

U.S. PATENT DOCUMENTS

| 6,411,997 B1 * | 6/2002 | Dawes et al. ............... 709/224 |
| 2002/0059078 A1 * | 5/2002 | Valdes et al. .................. 705/1 |
| 2002/0065599 A1 * | 5/2002 | Hameleers et al. ......... 701/117 |
| 2002/0065938 A1 * | 5/2002 | Jungck et al. ............... 709/246 |
| 2002/0145981 A1 * | 10/2002 | Klinker et al. ............... 370/244 |
| 2002/0147937 A1 * | 10/2002 | Wolf .............................. 714/4 |
| 2003/0063560 A1 * | 4/2003 | Jenq et al. ................... 370/216 |
| 2003/0088671 A1 * | 5/2003 | Klinker et al. ............... 709/225 |
| 2003/0097461 A1 * | 5/2003 | Barham et al. ............. 709/235 |
| 2003/0105855 A1 * | 6/2003 | Wynnyk ...................... 709/224 |
| 2003/0115355 A1 * | 6/2003 | Cometto et al. ............ 709/234 |
| 2003/0133417 A1 * | 7/2003 | Badt, Jr. ...................... 370/254 |
| 2003/0189900 A1 * | 10/2003 | Barany et al. ............... 370/229 |
| 2004/0037231 A1 * | 2/2004 | Heiner et al. ................ 370/252 |
| 2004/0088148 A1 * | 5/2004 | Szymanski et al. ........... 703/13 |
| 2004/0136379 A1 * | 7/2004 | Liao et al. ............. 370/395.21 |
| 2004/0153533 A1 * | 8/2004 | Lewis ......................... 709/223 |

OTHER PUBLICATIONS

Levine et al., "Organizing multicast receivers deterministically by packet loss correlation", ACM 1998.*
Lahiri et al., "Coomunicatuion architecture tuners: A methodology for the design of high-performance communication architecture for systems on the chip", ACM 2000.*

* cited by examiner

Primary Examiner—K Thangavelu
(74) Attorney, Agent, or Firm—Robert M. McDermott, Esq.

(57) ABSTRACT

A method and system for flow propagation analysis uses 'tracers' that are iteratively propagated through a simulated network between source and destination elements. These tracers are structured to contain traffic flow information from source to destination, and to reflect changes as the flow is affected by each element along the path from source to destination. The resultant flow information at the destination corresponds to the effective throughput from the source to the destination, and the flow information at the output of each intermediate element in the network corresponds to the potentially achievable throughput through that element for the given source-to-destination flow.

22 Claims, 2 Drawing Sheets

| Time | Tracer Status | Router A | | | Router B | | | Router C | | |
|---|---|---|---|---|---|---|---|---|---|---|
| | | F1 | F2 | F3 | F1 | F2 | F3 | F1 | F2 | F3 |
| T1 | Tf1 @ RA | 10/10 | - | - | - | - | - | - | - | - |
| T2 | Tf1 @ RB | | | | 10/10 | - | - | | | |
| T3 | Tf2 @ RA | 10/5 | 10/5 | - | | | | | | |
| T4 | Tf1 @ RC | | | | | | | 10/10 | - | - |
| T5 | Tf3 @ RB | | | | 10/5 | - | 10/5 | | | |
| T6 | Tf2 @ RB | | | | 10/4 | 5/2 | 10/4 | | | |
| T7 | T'f1 @ RA | 10/5 | 10/5 | - | | | | | | |
| T8 | Tf3 @ RC | | | | | | | 10/6.66 | - | 5/3.33 |
| T9 | T'f1 @ RB | | | | 5/2.5 | 5/2.5 | 10/5 | | | |
| T10 | T'f1 @ RC | | | | | | | 2.5/2.5 | - | 5/5 |
| ... | | | | | | | | | | |

R1/R2: Incoming Rate/Allocated Rate

FLOW PROPAGATION ANALYSIS USING ITERATIVE SIGNALING

This Application claims the benefit of U.S. Provisional Patent Application No. 60/344,940, filed Dec. 21, 2001.

BACKGROUND OF THE INVENTION

1. Field of the Invention

This invention relates to the field of simulation, and in particular to the simulation of computer networks or other networks having bandwidth limitations that shape the traffic flow within the network.

2. Description of Related Art

As the demand for information flow continues to increase, establishing and maintaining an efficient network configuration to handle the increased flow typically requires complex analysis and planning. Generally, the analysis includes the identification of 'bottlenecks' where information flow is substantially impeded, or is expected to be impeded with future increases in traffic flow, and the planning includes the replacement or upgrading of equipment, or a reconfiguration of the network topology, to remove such bottlenecks, based on 'what-if' analyses of the benefits provided if such equipment or topology changes are made.

A common task for a network simulation system is "flow propagation analysis", wherein the flow throughput is determined under a variety of traffic-flow scenarios. For example, a nominal data flow of 10 Mbps bandwidth may exist between a source device and a destination device, but if some of the 10 Mbps bandwidth elements between the source and destination device are also providing communication paths between other sources and destinations, the effective throughput between the original source and destination device will be dependent upon the amount of bandwidth consumed by the traffic-flow among the other communication paths. If a particular router, for example, is common to multiple high-traffic communication paths, and does not have sufficient bandwidth to support these multiple traffic flows, it will force the high-traffic flows to be 'throttled' to a lower-than-maximum throughput. Flow-propagation-analysis provides an assessment of the effective bandwidth available to each traffic flow, assuming a given traffic profile.

Computer-based analysis is commonly used to evaluate the performance of existing or proposed networks. Most analysis systems fall into one of two categories: analytical modeling systems and discrete-event simulation systems. In an analytical modeling system, mathematical equations, such as the equations that define the steady-state behavior of stochastic queues, are used to represent the performance of the network, and the analysis of the performance of the network involves determining a solution to the equations, given a set of input parameters. Analytic modeling, however, is generally infeasible for modeling the transient and/or adaptive behavior that is typical of a dynamic network.

In a discrete-event simulation system, a user describes the network as a collection of interconnected network elements. Each network element has an associated functional model that is configured to propagate the effects of an event at the element's input, to produce subsequent events at its output. The user also describes the activities that are to be simulated, and the simulation system generates discrete-events at the appropriate elements, then propagates the effects of these events, and subsequently generated events at the outputs of each of the elements, from one element to the next, thereby simulating the behavior of each of the elements in response to the activities that are being simulated.

Discrete-event simulation systems are effective for modeling transient and/or adaptive behavior, because the model of each element can be configured to effect the desired behavior in response to incoming events, and the interconnection of elements can provide a model of the feedback among elements that often causes transients and/or adaptation. However, discrete-event simulations may exhibit poor performance, in terms of time taken to perform the simulation, because of the large number of events that can be triggered by each generated activity event, particularly in large networks with heavy traffic that include feedback paths, and when simulating concurrently generated activity events, such as generated traffic from multiple sources.

Of particular note, multiple-input limited-bandwidth network elements, such as a router or switch element, consume substantial simulation time to arrive at a steady-state assessment of the effective throughput of each traffic flow, because the propagation of an input event on one input channel of each multiple-input element is dependent upon the prior and concurrent arrival of events on other input channels, and, in the case of a prioritization scheme being applied among channels, may be dependent upon future arrivals of events on higher-priority channels.

BRIEF SUMMARY OF THE INVENTION

It is an object of this invention to provide a method and system for efficiently determining the effective throughput of traffic flows in a network. It is a further object of this invention to improve the performance of a simulation system for flow-propagation analysis. It is a further object of this invention to improve the performance of a simulation system for simulating multiple-input limited-bandwidth elements in a network.

These objects and others are achieved by a method and system that uses an iterative signaling approach using 'tracers' that are propagated through a simulated network between source and destination elements. These tracers are structured to contain traffic flow information from source to destination, and to reflect changes as the flow is affected by each element along the path from source to destination. The resultant flow information at the destination corresponds to the effective throughput from the source to the destination, and the flow information at the output of each intermediate element in the network corresponds to the potentially achievable throughput through that element for the given source-to-destination flow.

In a preferred embodiment, changes to traffic flow information on other flows by a given tracer are not propagated downstream by this tracer. When a tracer corresponding to another flow arrives at a node, the traffic flow information for this flow is updated to reflect any changes caused by other tracers, and the propagation of the tracer updated traffic flow information along its designated path. An iterative generation and propagation of tracers along each path provides for an accurate steady-state flow analysis determination within relatively few iterations, depending upon the complexity of the network. Although this restricted propagation scheme introduces some inaccuracy and imprecision during a transition period after a change of flow occurs, the gains in efficiency for performing steady-state propagation flow analysis are substantial compared to conventional discrete-event simulation systems. In a further optimization of this invention, each tracer is configured to optionally contain traffic flow information related to other traffic flows, thereby reducing the number of iterations required to converge on the steady-state values of throughput for each flow along its designated path.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

This invention is particularly well suited for use as a stand-alone flow-propagation analysis tool, or for performing flow-propagation analysis in a discrete-event simulator, or for a variety of uses in a hybrid simulator, discussed below. For ease of understanding, the invention is initially presented in the context of a stand-alone propagation analysis tool. Also for ease of understanding, the invention is initially presented in the context of an analysis of average throughput, although the invention is not limited to a determination of averages, as will be detailed further below.

Figures 1A, 1B:
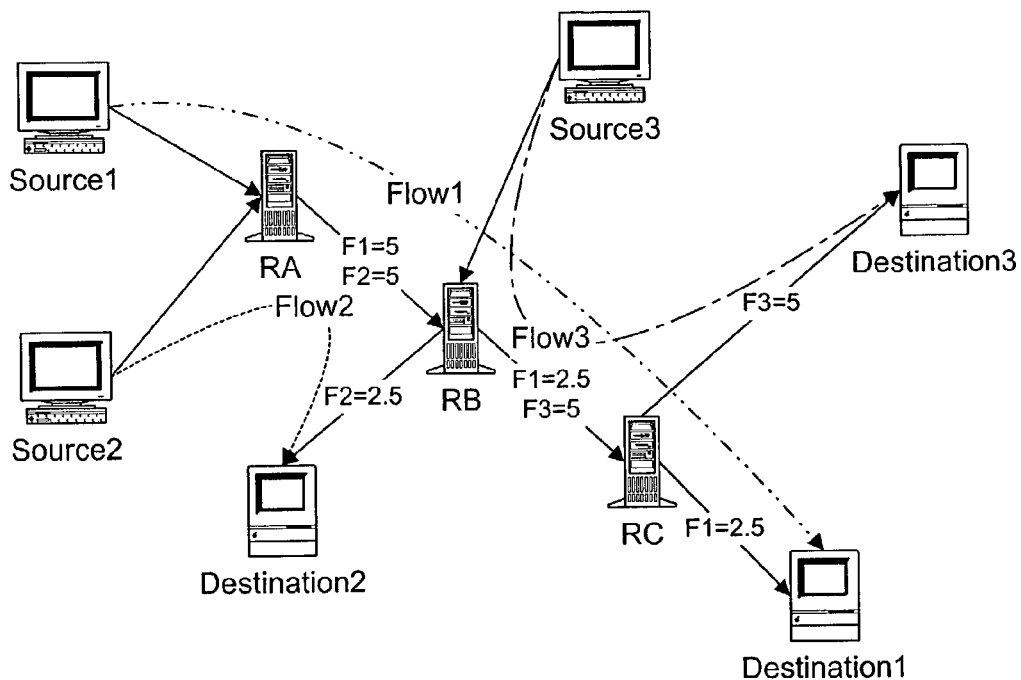
FIG. 1A illustrates an example model of a network, illustrating three traffic flows through a network of three routers.
FIG. 1B illustrates an example flow propagation analysis of the modeled network of FIG. 1A, using tracers in accordance with this invention.

FIG. 1A illustrates an example model of a network, illustrating three traffic flows through a network of three routers, RA, RB, and RC. Flow1 corresponds to traffic between a source device, Source1, and a destination device, Destination1. Flow2 corresponds to traffic between Source2 and Destination2, and Flow3 corresponds to traffic between Source3 and Destination3. In this example, it is assumed that each device is capable of communicating at a 10 Mbps rate, and that each router has a total bandwidth of 10 Mbps. One of ordinary skill in the art will recognize that the routers are representative of a multiple-input limited-bandwidth network element that affect traffic flow through the element, and that this invention is not limited to flow through routers, per se.

Nominally, Source1 has a 10 Mbps communication path to Destination1. However, a 10 Mbps flow between Source1 and Destination1 will only occur if neither Source2 nor Source3 is communicating with Destination2 or Destination3, respectively. Router RA is in the path of both Flow1 and Flow2. When Source2 communicates with Destination2 along Flow2, some of the available bandwidth in router RA must be allocated to Flow2, thereby causing a throttling of Flow1 to a rate less than the total 10 Mbps bandwidth. In like manner, router RB is in the path of Flow1, Flow2, and Flow3, and a further reduction of throughput from Source1 to Destination1 will occur whenever traffic flows from Source3 to Destination3 via Flow3.

In an analytical analysis system, queuing-theory equations would typically be used to represent each of the routers, wherein each input to each router has an associated arrival-rate, each router has an associated service-rate, and the equations provide a determined departure-rate, based on the arrival-rates, the service-rate, and a service-allocation scheme. The determined departure-rates of an intermediate element are the arrival-rates that are used in the equations of the next element(s) along each path. The effective throughput along each of the flow paths is determined via a simultaneous solution of all of the equations, assuming that such a solution exists.

In a discrete-event simulation system, each router is represented by a model of a multiple-input, multiple-output queue. Each of the sources Source1, Source2, Source3 generates explicit events corresponding to the transmission of each simulated packet or other unit of transmission, at its nominal transmission rate. As each event arrives at a router model, the transmitted unit is placed in the queue. Based on the parameters (e.g. service-rate) of the particular router, units are periodically removed from the queue and propagated to the next element in the network, depending upon their destination, thereby freeing room in the queue for newly arriving units.

In accordance with this invention, a higher-level of abstraction is used to model and propagate flow information through a network. An information-carrying entity, herein termed a "tracer", is used to propagate the information related to the flow of transmission units through elements, rather than the generation and propagation of the individual transmission units, as typically required in a discrete-event simulation system. In this example, a stream of tracer elements are associated with each flow, each tracer element being configured to contain a measure of the effective flow-rate as the tracer element is propagated from source to destination. As each tracer arrives at each router, the router updates its allocation of bandwidth among the flows through the router, as required, based on the flow-rate information that is contained in the tracer. If a re-allocation of bandwidth affects the flow-rate of the path corresponding to the tracer, the flow-rate information in the tracer is updated to reflect this change. The determined departure-rates of an intermediate element are the arrival-rates that are used in the equations of the next element(s) along each path. The tracer then proceeds to the next element along the flow-path, and again its flow-rate information is used as required to update the allocation of bandwidth at the next element, and, its flow-rate information is subsequently updated based on any changes at this next element.

FIG. 1B illustrates an example propagation flow analysis of the modeled network of FIG. 1A, using tracers in accordance with this invention. For ease of understanding and explanation, each tracer is illustrated in FIG. 1B as arriving at a router at a different time, T1–T10, in an arbitrary order. One of ordinary skill in the art will recognize that alternative propagation strategies may be equivalently employed, such as the propagation of a tracer continuously from its source to its destination before a tracer from another source is generated and propagated, or, an unordered propagation of tracers, wherein tracers along multiple flows may arrive at an element simultaneously.

In this example, each of the sources have traffic to communicate to a destination, preferably at their maximum flow-rate of 10 Mbps. Thus, the flow-rate information in the tracer from each source will contain a flow-rate of 10 Mbps.

At time T1, the first tracer of Flow1, Tf1, arrives at router RA, from source Source1. As noted above, this tracer will identify a flow-rate of 10 Mbps. Because router RA can support a flow-rate of 10 Mbps, and no other tracers have yet been received at router RA, router RA allocates its entire bandwidth of 10 Mbps to Flow1. Because there is no change to the flow-rate of Flow1, the flow-rate in the tracer Tf1 remains at 10 Mbps as it is propagated to router RB.

At time T2, the tracer Tf1 arrives at router RB. Again, because router RB is not aware of any other traffic, having not yet received any other tracers, router RB allocates its entire 10 Mbps bandwidth to Flow1, and the flow-rate in the tracer Tf1 remains at 10 Mbps as it is propagated to router RC. (As noted above, the tracer Tf1 could at this point be propagated and processed by router RC, but in this example, to illustrate the relative independence of this invention on the specific propagation sequence, the tracer Tf1 is not processed at RC until time T4, below.)

At time T3, a tracer Tf2 for Flow2 is generated at Source2 and arrives at router RA. As noted above, router RA had previously allocated its entire bandwidth to Flow1. Upon receipt of this tracer Tf2, router RA re-allocates its bandwidth between Flow1 and Flow 2, depending upon the model used for bandwidth allocation. In this example, bandwidth is allocated proportionally among all the flows based on their incoming flow-rates. The incoming flow rates for both Flow1 and Flow2 are the same (10 Mbps), therefore at time T3, router RA allocates half (5 Mbps) of its total bandwidth (10 Mbps) to each of Flow1 and Flow2, as illustrated at the entry in the Router A column at time T3. The entry shows the incoming flow-rates and the allocated (outgoing) flow-rates. Because only half the bandwidth is allocated to Flow2, the outgoing flow-rate information in Tf2 is updated to reflect the fact that the flow-rate of Flow2 has been throttled to 5 Mbps as the tracer Tf2 is propagated to router RB (the outgoing flow rate at router RA becomes the incoming flow rate at router RB). Note that although the flow-rate of Flow1 has also changed, this new information is not necessarily propagated until a new tracer arrives from Source1 (in this example, at T7, below).

At time T4, the tracer Tf1 arrives at router RC from router RB. The flow-information in tracer Tf1 still reflects the 10 Mbps flow-rate of Flow 1, and, because router RC is unaware of any other traffic, the entire 10 Mbps bandwidth of RC is allocated to Flow1, and the flow-rate in Tf1 remains unchanged as it is propagated to Destination1. Note that this is an inaccurate assessment of the flow rate of Flow1 to Destination1, because it is based on incomplete information (the lack of information regarding competing flows as Tf1 propagated through each of the routers RA, RB, RC). As will be illustrated in this example, the iterative nature of this invention provides for a fairly rapid convergence on an accurate determination of the flow-rate, and these transient inaccuracies are ignored in return for the improved performance provided by this invention.

At time T5, a tracer Tf3 from Source3 arrives at router RB. As in router RA at time T3, router RB re-allocates its bandwidth between its known flows (Flow1 from Tf1, and Flow3 from Tf3; Tf2 has not yet arrived at RB). The flow-rate information of Tf3 is updated to reflect a resultant flow-rate of 5 Mbps as it is propagated to router RC.

At time T6, the tracer Tf2 arrives at router RB, from RA. At this point, router RB is now aware of three traffic-flows, and re-allocates its bandwidth according to the rules associated with the model of the router RB. In this example, each router is configured to allocate bandwidth proportionally to the incoming flow-rates. Other allocation schemes could have been used, corresponding to the actual allocation scheme that is used in the actual (physical) router corresponding to the modeled router RB in FIG. 1A. The incoming flow-rates for Flow1 and Flow3 are 10 Mbps, while the incoming flow-rate of Flow2 is only 5 Mbps (it was throttled previously from 10 Mbps at router RA at time T3). The total available bandwidth (10 Mbps) is therefore divided among the 3 flows in the following way: Flow1 and Flow3 are allocated 4 Mbps each, and Flow2 is allocated 2 Mbps, as illustrated in the Router B column of FIG. 1B at time T6 (the entry is showing the incoming and the allocated rates). The flow-rate of tracer Tf2 is updated to reflect its 2 Mbps rate as it is propagated from router RB to Destination2. As will be seen, this is still not the converged flow-rate for Flow2 between Source2 and Destination2.

At time T7, a new tracer T'f1 from Source1 arrives at router RA. This tracer T'f1 brings no new information to router RA, but it receives an updated flow-rate from router RA, reflecting the fact that router RA's bandwidth has been divided between Flow1 and Flow2 (at time T3, above). This new flow-rate information is propagated to router RB with T'f1.

At time T8, tracer Tf3 arrives at router RC, reflecting a flow-rate for Flow3 of 5 Mbps from RB. The incoming flow-rate for Flow1 is 10 Mbps, therefore router RC re-allocates its 10 Mbps bandwidth in proportion 2:1 between the two flows giving Flow1 a bandwidth of 6.666 Mbps and Flow3 a bandwidth of 3.333 Mbps. Tracer Tf3 then propagates this new flow rate of Flow3 to Destination 3.

At time T9, tracer T'f1 arrives at router RB. The new incoming flow rate of 5 Mbps that this tracer brings in causes a subsequent bandwidth reallocation among the flows. The incoming flow-rates for Flow1, Flow2 and Flow3 are 5 Mbps, 5 Mbps and 10 Mbps respectively. This results in the following bandwidth allocation: Both Flow1 and Flow2 are allocated 2.5 Mbps, while Flow3 is allocated 5 Mbps. Tracer T'f1 is updated to reflect the throttled outgoing flow-rate of Flow1 (2.5 Mbps) and propagated to router RC.

At time T10, tracer T'f1 arrives at router RC, reflecting Flow1's effective flow-rate of 2.5 Mbps from router RB. The incoming flow rates for Flow1 (2.5 MBps) and Flow3 (5 Mbps) can be both accommodated by the total available bandwidth. The allocated rates therefore get updated to reflect these incoming rates.

Subsequent propagations of traces for each flow will not result in a change of flow-rates through each router, and thus, the flow rates illustrated in FIG. 1B reflect the converged flow rates through the system, and are reflected in the corresponding links of the network illustrated in FIG. 1A. Note that in each link, the flow-rate is the maximum allowable flow-rate, given the bandwidth limitation of succeeding bandwidth-limited network elements. The effective throughput of each flow is determined at the destinations of each flow. That is, the effective flow rate of Flow1, from Source1 to Destination1 in the configuration illustrated, with maximum traffic-demand between each source and destination is 2.5 Mbps; the effective flow rate from Source2 to Destination2 is 2.5 Mbps; and the effective flow rate from Source3 to Destination3 is 5 Mbps. As is evident from FIG. 1B, router RB is a bottleneck that is limiting Flow1 and Flow2 to 2.5 Mbps, and router RC is underutilized. Increasing the bandwidth of router RB, or changing the topology of the network to provide alternative paths to router RC, will increase the effective throughput of Flow1 and Flow2. In like manner, if the actual (physical) router corresponding to the model router RB allows alternative bandwidth-allocation strategies, the effective throughput of each flow can be balanced by allocating more bandwidth to the channel from router RA than to the channel from Source3. Other uses of the flow-information that is provided by the tracers of this invention for improving network performance will be evident to one of ordinary skill in the art in view of this disclosure.

The above describes the basic principles of this invention, in a relatively stand-alone application. The following describes the integration of this invention within a hybrid-simulator for effective and efficient simulation of complex communication networks in a timely manner.

Copending U.S. patent application "NETWORK SIMULATION", Ser. No. 09/624,092, filed Jul. 24, 2000 for Alain Cohen, George Cathey, and P J Malloy, discloses a hybrid simulator that combines the advantages of analytical modeling and discrete-event simulation, and is incorporated by reference herein. In this simulator, traffic on the network is modeled as a combination of "background-traffic" and "explicit-traffic". The background-traffic is processed primarily in analytic form, except in the vicinity of an explicit-traffic event. Explicit-traffic events are processed using discrete-event simulation, with particularized background-traffic events in the vicinity of the explicit-traffic event also being processed using the discrete-event simulation. By integrating the principles of the current invention with the principles of this copending application, difficulties in analytical modeling of background-traffic flow analysis in a complex network are eliminated, network performance in the presence of background-traffic is more accurately modeled, and the discrete-event simulation time is substantially reduced.

Figure 2:
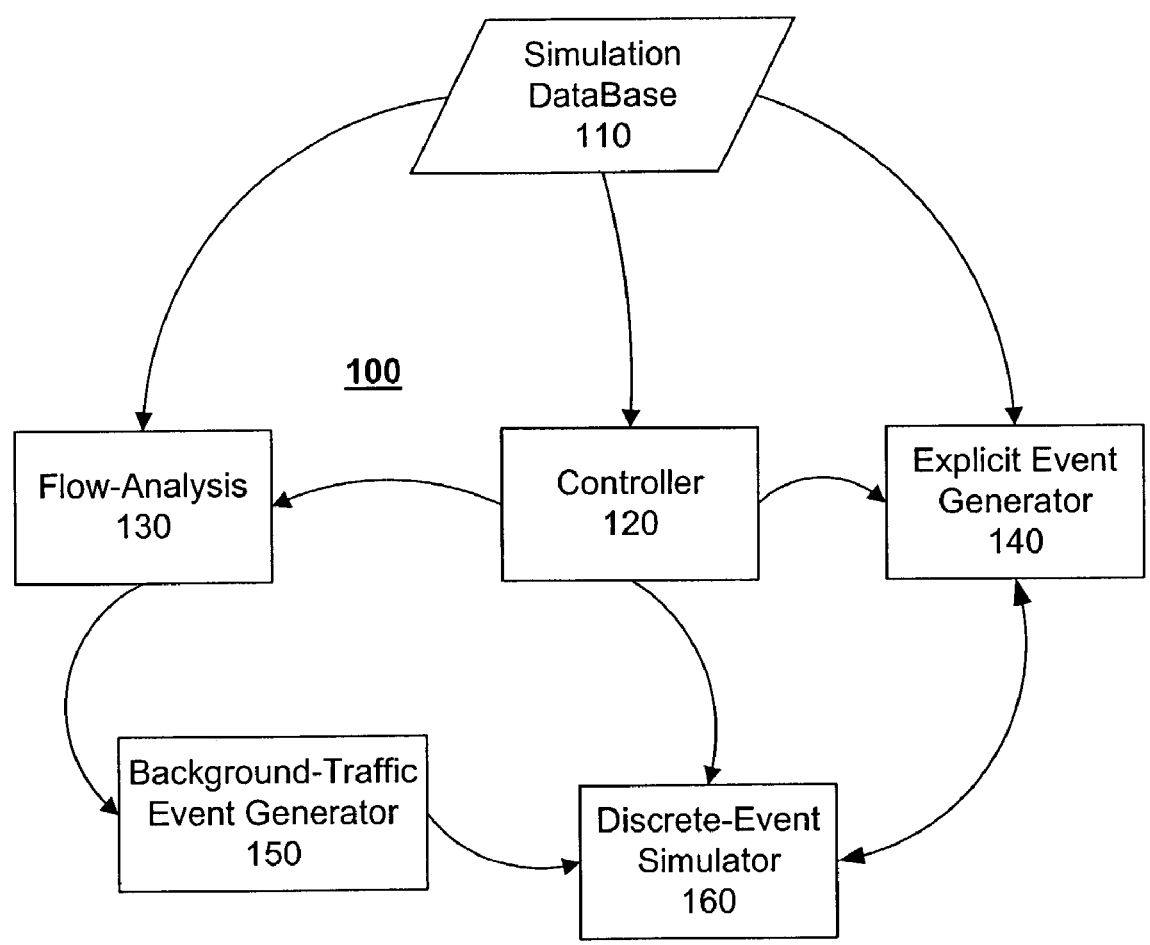
FIG. 2 illustrates an example block diagram of a simulation system in accordance with this invention.

FIG. 2 illustrates an example block diagram of a hybrid simulation system 100 in accordance with this invention. A controller 120 processes information contained in the simulation database 110. The simulation database 110 includes a description of the topology of the network as an interconnection of network elements, an identification of the model and parameters to be used for simulating each network element, and a description of the conditions under which the network is to be simulated, including a description of background-traffic and explicit-traffic to be simulated. Based on the information in the database 110, the controller controls an explicit-event generator 140 to generate the explicit-events, and a flow-analysis subsystem 130 to determine the effective flow rates associated with the specified background-traffic. A background generator 150 uses the determined flow rates to generate the aforementioned particularized background-traffic events corresponding to these flow rates in the vicinity of each generated explicit-event. The explicit-events and particularized background-traffic events are provided to a discrete-event simulator 160. As in a conventional discrete-event simulator, the simulator 160 propagates the events through the modeled network, simulating the effects produced by each network element in response to these events, including the generation of other explicit-events that are propagated to other network elements at the simulated time of occurrence of each of the events.

In this hybrid simulation system 100, background-traffic flow is defined as an analytical traffic flow between a specific pair of source and destination nodes that has certain time dependent traffic characteristics, such as traffic volume (specified both in terms of bits per second and packets per second), the types of statistical distribution characterizing inter-arrival times and packet sizes for this traffic, type of service, etc. A typical network can contain many such flows. Each flow characterizes a dynamic flow pattern that changes during the course of the flow propagation from the source node to the destination node as a result of different congestion conditions and scheduling disciplines encountered at intermediate downstream nodes/links. For example, a flow originally carrying 10 Mbps of traffic would necessarily get throttled (shaped) when it propagates through a link whose capacity is only 1 Mbps. Similarly, traffic volume reduction can be expected when the flow contends for a given bandwidth with other existing flows, as discussed above. Such conditions can also affect the statistical characteristics of the flow, especially in cases when a more complex queuing/scheduling mechanism is used, such as Custom Queuing (CQ), Weighted Fair Queuing (WFQ), and so on.

The use of this invention for background-traffic modeling provides a fast and accurate approach of modeling complex flows in a heterogeneous network, albeit, in order to provide the efficiencies realizable by this invention, some approximations are introduced. A simplified model of the inter-flow interactions as well as a mechanism for handling the complex time-dependent behavior is used to achieve the efficiencies of this invention. As detailed above, tracers are used to carry aggregate traffic-flow information from source to destination and to update the relevant elements along the way. Each network element processes this information and uses it (e.g., in local queuing algorithm) for evaluating delays and other statistics of interest. When leaving a node, the flow information contained in the tracer is modified as required, based on the local conditions (congestion level, available bandwidth, type of queuing scheme, etc.) and carried to the next downstream node in its path from source to destination. Thereby, the tracer serves as a medium for traffic updates propagating the changed flow information to downstream nodes for the particular given flow. This flow information may address the average flow, as discussed above, but may also contain parameters that further define the flow characteristics, such as the distribution function that characterizes the flow, the variance of flow about the average, and so on.

As discussed above, the changes to one flow affect other flows flowing through a common node. In accordance with this invention, their traffic information will get updated locally on the node itself but will not get propagated to the other downstream nodes directly. Sending the updated information to all affected nodes, in most instances, is a time-consuming and often not relevant to the current analysis. More significantly, these changes may, in general, result in cyclic propagation of changes to flow information, further delaying an achievement of a steady-state flow determination. In one embodiment of this invention, the new information for any of the other flows will propagate only when a new tracer for that particular flow arrives. This restricted propagation scheme allows for the propagation of information to only the networks elements that need that changed information and circumvents the problem of cyclic propagation of new information.

In a preferred embodiment of this invention, parameters that specify how often these updates occur, including the frequency of tracers per flow, permit control over inaccuracies that the higher-level of abstraction of information may cause.

With the arrivals of new tracers for different flows, the updated traffic information iteratively propagates through the network, and after a certain number of iterations, the network traffic information converges to the stable state. The primary advantage of using this approach, with respect to the one that allows triggered updates, is that the total number of tracers is finite and controllable. As mentioned above, allowing triggered updates often leads to uncontrolled flooding of the network with tracers. Also, the processing of these tracers in an uncontrolled approach will be computationally expensive, making the use of the background simulation mode counter-productive.

In accordance with a second aspect of this invention, the speed of convergence of the method of this invention can further be improved by using a "piggybacking" mechanism, wherein flow-information of one or more other flows are 'piggybacked' onto the flow-information of a tracer for a given flow. In such an embodiment, the tracer leaving a network element is configured to carry updated information not only about its own flow, but also about all other flows traversing the path. For example, at time T6 in the example flow-propagation of FIG. 1B, the tracer for Flow3, Tf3, is only updated to reflect the updated flow of Flow3. In accordance with this second aspect of the invention, the tracer Tf3 is configured to also communicate the updated flow information related to the other flows, and in particular, to Flow1. In this manner, if Tf3 conveys the revised flow-information for Flow1 to router RC at time T8, then the router RC would be updated to reflect a 2.5 Mbps flow for Flow1, thereby shortening the time to convergence from T10 to T8.

As noted above, each tracer includes flow-information that is not limited to merely the average flow-rate. In a preferred embodiment of this invention, each tracer includes the following fields:

Source node identifier;
Destination node identifier;
Flow identifier;
Traffic volume (flow rate) in bits per second, and/or in packets per second;
Packet size probability distribution function (PDF), if applicable;
Variance of the packet size;
Inter-arrival time probability distribution function; and,
Variance of the inter-arrival times.

One of ordinary skill in the art will recognize that other parameters related to flow could also be used to characterize the flow through elements of a network. As each tracer is propagated through each network elements, one or more of these fields, other than the first three, are updated to reflect the affects introduced by the particular element. For example, as each flow is throttled, both the inter-arrival time and the variance of the inter-arrival times can be expected to decrease. If a particular network element 'repackages' a unit of transmission, such as a packet, multiple parameters of the packet-size PDF could be expected to change, as well as the number of packets per second, even if the element introduces no degradation in the overall throughput of the flow through the element.

The foregoing merely illustrates the principles of the invention. It will thus be appreciated that those skilled in the art will be able to devise various arrangements which, although not explicitly described or shown herein, embody the principles of the invention and are thus within its spirit and scope. For example, although the invention is presented herein in terms of modeling a computer network, one of ordinary skill in the art will recognize that the principles of this invention can be applied to other applications of flow analysis, including, for example, vehicular traffic flow along a network of roads, intersections, and interchanges, wherein each segment of road, intersection, or interchange is modeled as a multiple-input bandwidth-limited device, and the effective flow-rates of flows of traffic between select geographic points are determined by communicating information-containing tracers along selected paths in the network. Additionally, other enhancements can be made to this invention, including the 'back-annotation' of flows through the network, based on the determined steady-state flow from each source to each destination. These and other system configuration and optimization features will be evident to one of ordinary skill in the art in view of this disclosure, and are included within the scope of the following claims.

We claim:

1. A method for analyzing traffic flow in a modeled network, comprising:
    defining a plurality of traffic flows, each traffic flow of the plurality of traffic flows corresponding to a path from a source node to a destination node in the modeled network,
    generating a plurality of streams of tracers, each stream of tracers being associated with one traffic flow of the plurality of traffic flows, and each tracer of each stream of tracers being structured to contain flow information related to the traffic flow corresponding to the tracer,
    propagating each tracer through the modeled network along the path from the source node to the destination node of the tracer's corresponding traffic flow, and
    updating the flow information in each tracer based on changes to the tracer's corresponding traffic flow introduced by nodes in the modeled network along the path from the source node to the destination node of the tracer's corresponding traffic flow.

2. The method of claim 1, wherein the changes to the tracer's corresponding traffic flow is based on at least one of:
    a bandwidth limitation,
    a bandwidth allocation scheme, and
    one or more parameters of a queuing model, associated with the nodes in the modeled network.

3. The method of claim 1, wherein the flow information includes an average flow rate along the path from the source node to the destination node of the tracer's corresponding traffic flow.

4. The method of claim 3, wherein the flow information further includes at least one of:
    a variance about the average flow rate,
    a size of a transmission unit,
    a variance of the size of the transmission unit,
    a probability distribution of sizes of a plurality of transmission units, and
    a probability distribution of arrival times of the plurality of transmission units.

5. The method of claim 1, wherein the flow information in each tracer includes other flow information associated with other traffic flows of the plurality of traffic flows, and
    updating the flow information in each tracer includes updating some or all of the other flow information.

6. A computer program for analyzing traffic flow in a modeled network, which, when executed on a computer system, causes the computer system to:
    create a plurality of traffic flows, each traffic flow of the plurality of traffic flows corresponding to a path from a source node to a destination node in the modeled network,
    generate a plurality of streams of tracers, each stream of tracers being associated with one traffic flow of the plurality of traffic flows, and each tracer of each stream of tracers being structured to contain flow information related to the traffic flow corresponding to the tracer,
    propagate each tracer through the modeled network along the path from the source node to the destination node of the tracer's corresponding traffic flow, and
    update the flow information in each tracer based on changes to the tracer's corresponding traffic flow introduced by nodes in the modeled network along the path from the source node to the destination node of the tracer's corresponding traffic flow.

7. The program of claim 6, wherein the changes to the tracer's corresponding traffic flow is based on at least one of:
    a bandwidth limitation, a bandwidth allocation scheme, and one or more parameters of a queuing model, associated with the nodes in the modeled network.

8. The program of claim 6, wherein the flow information includes an average flow rate along the path from the source node to the destination node of the tracer's corresponding traffic flow.

9. The program of claim 8, wherein the flow information further includes at least one of:

a variance about the average flow rate, a size of a transmission unit, a variance of the size of the transmission unit, a probability distribution of sizes of a plurality of transmission units, and a probability distribution of arrival times of the plurality of transmission units.

10. The program of claim 6, wherein the flow information in each tracer includes other flow information associated with other traffic flows of the plurality of traffic flows, and updating the flow information in each tracer includes updating some or all of the other flow information.

11. A network simulator comprising:

a flow analysis subsystem that is configured to propagate tracers along select paths from source nodes to destination nodes of traffic flows of the network, wherein the tracers are configured to contain flow information corresponding to the traffic flows of the select paths, and the flow analysis subsystem updates the flow information of the tracers based on changes to the tracers' corresponding traffic flows introduced by one or more network elements along the select paths.

12. The network simulator of claim 11, including:

a discrete event simulator that is configured to simulate elements in a network based on explicit traffic events and particularized background traffic events, wherein the flow analysis subsystem is configured to determine flow rates associated with background traffic, and the particularized background traffic events are based on the determined flow rates associated with the background traffic.

13. The network simulator of claim 11, wherein the changes to the tracers' corresponding traffic flows are based on at least one of:

a bandwidth limitation, a bandwidth allocation scheme, and one or more parameters of a queuing model.

14. The network simulator of claim 11, wherein the flow information includes average flow rates along the select paths.

15. The network simulator of claim 14, wherein the flow information further includes at least one of:

variances about the average flow rates, sizes of transmission units, variances of the sizes of the transmission units, probability distributions of sizes of a plurality of transmission units, and probability distributions of arrival times of the plurality of transmission units.

16. The network simulator of claim 12, wherein the flow information in each of the tracers includes other flow information associated with other traffic flows of the plurality of traffic flows, and updating the flow information in each of the tracers includes updating some or all of the other flow information.

17. A computer program on a computer readable media that is configured to be executed on a computer system, comprising computer instructions for:

a flow analysis subsystem that is configured to propagate tracers along select paths from source nodes to destination nodes of traffic flows of the network, wherein the tracers are configured to contain flow information corresponding to the traffic flows of the select paths, and the flow analysis subsystem updates the flow information of the tracers based on changes to the tracers' corresponding traffic flows introduced by one or more network elements along the select paths.

18. The computer program of claim 17 including:

a discrete event simulator that is configured to simulate elements in a network based on explicit traffic events and particularized background traffic events, and a flow analysis subsystem that is configured to determine flow rates associated with background traffic, wherein the particularized background traffic events are based on the determined flow rates associated with the background traffic.

19. The computer program of claim 17, wherein the changes to the tracers' corresponding traffic flows are based on at least one of:

a bandwidth limitation, a bandwidth allocation scheme, and one or more parameters of a queuing model.

20. The computer program of claim 17, wherein the flow information includes average flow rates along the select paths.

21. The computer program of claim 20, wherein the flow information further includes at least one of:

variances about the average flow rates, sizes of transmission units, variances of the sizes of the transmission units, probability distributions of sizes of a plurality of transmission units, and probability distributions of arrival times of the plurality of transmission units.

22. The computer program of claim 17, wherein the flow information in each of the tracers includes other flow information associated with other traffic flows of the plurality of traffic flows, and updating the flow information in each of the tracers includes updating some or all of the other flow information.

* * * * *